Aug. 25, 1925. 1,551,525
O. O. HAMER
BAG SEALING MACHINE
Filed June 10, 1921   10 Sheets-Sheet 1
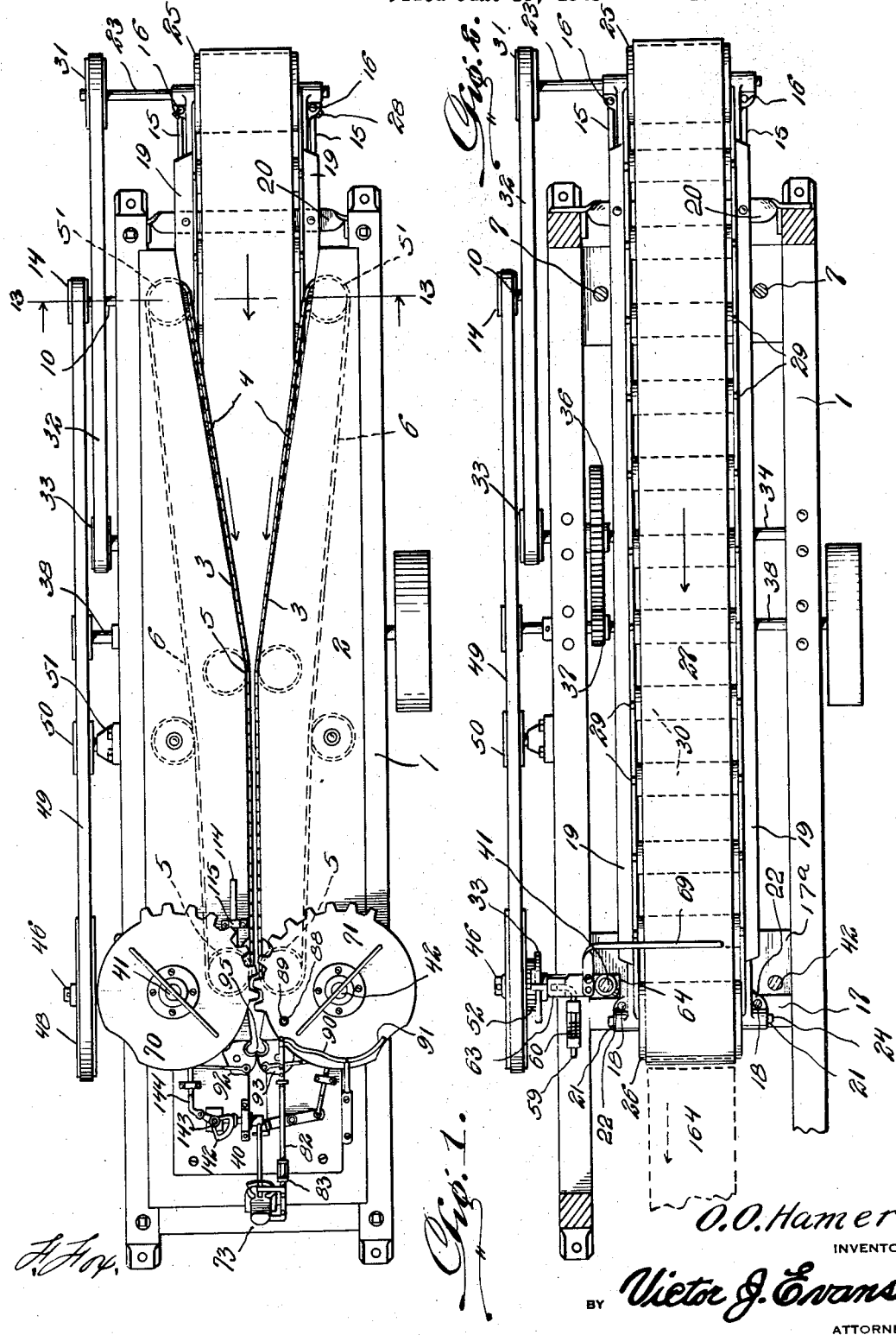
O. O. Hamer.
INVENTOR
BY Victor J. Evans.
ATTORNEY

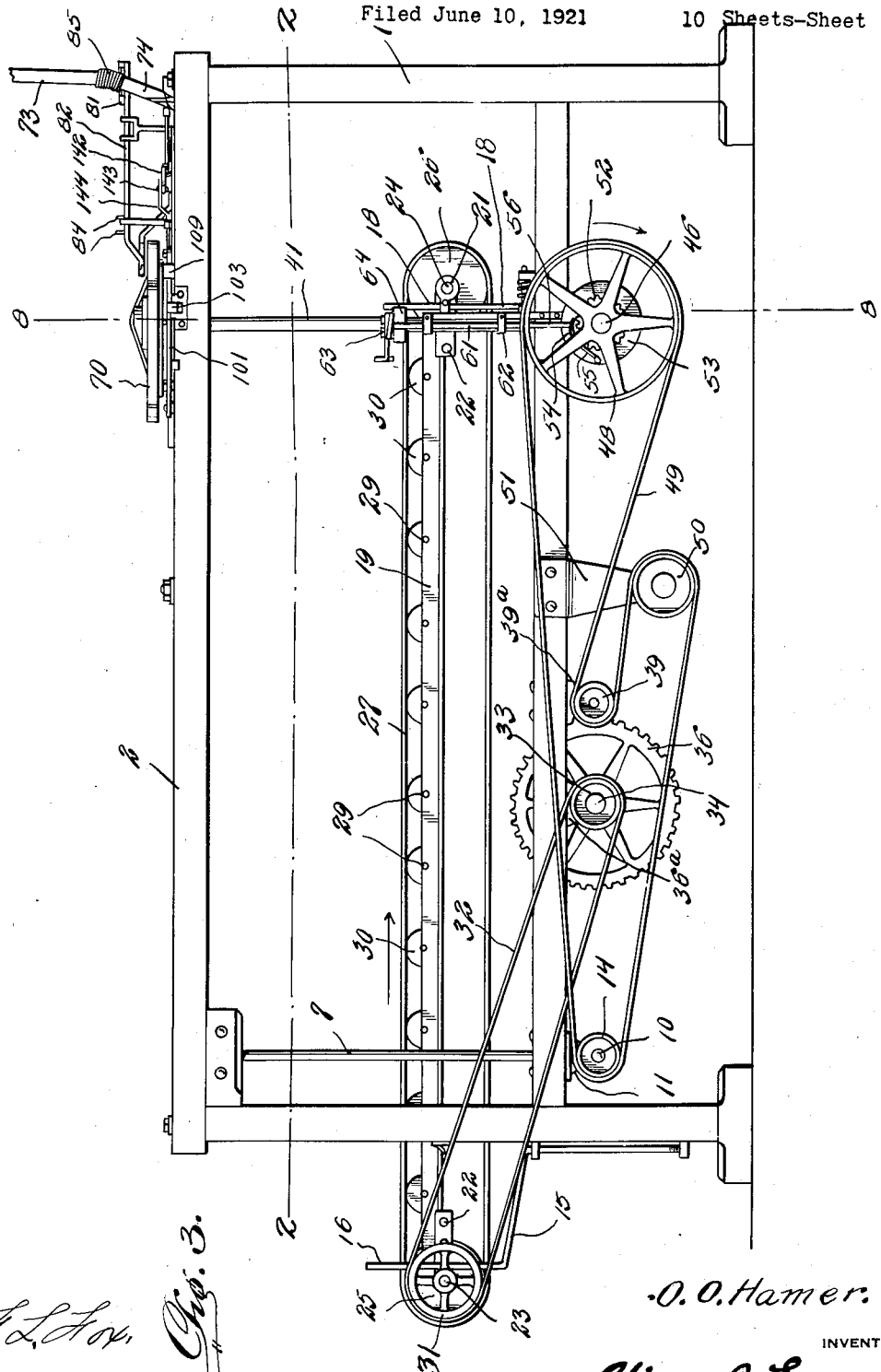

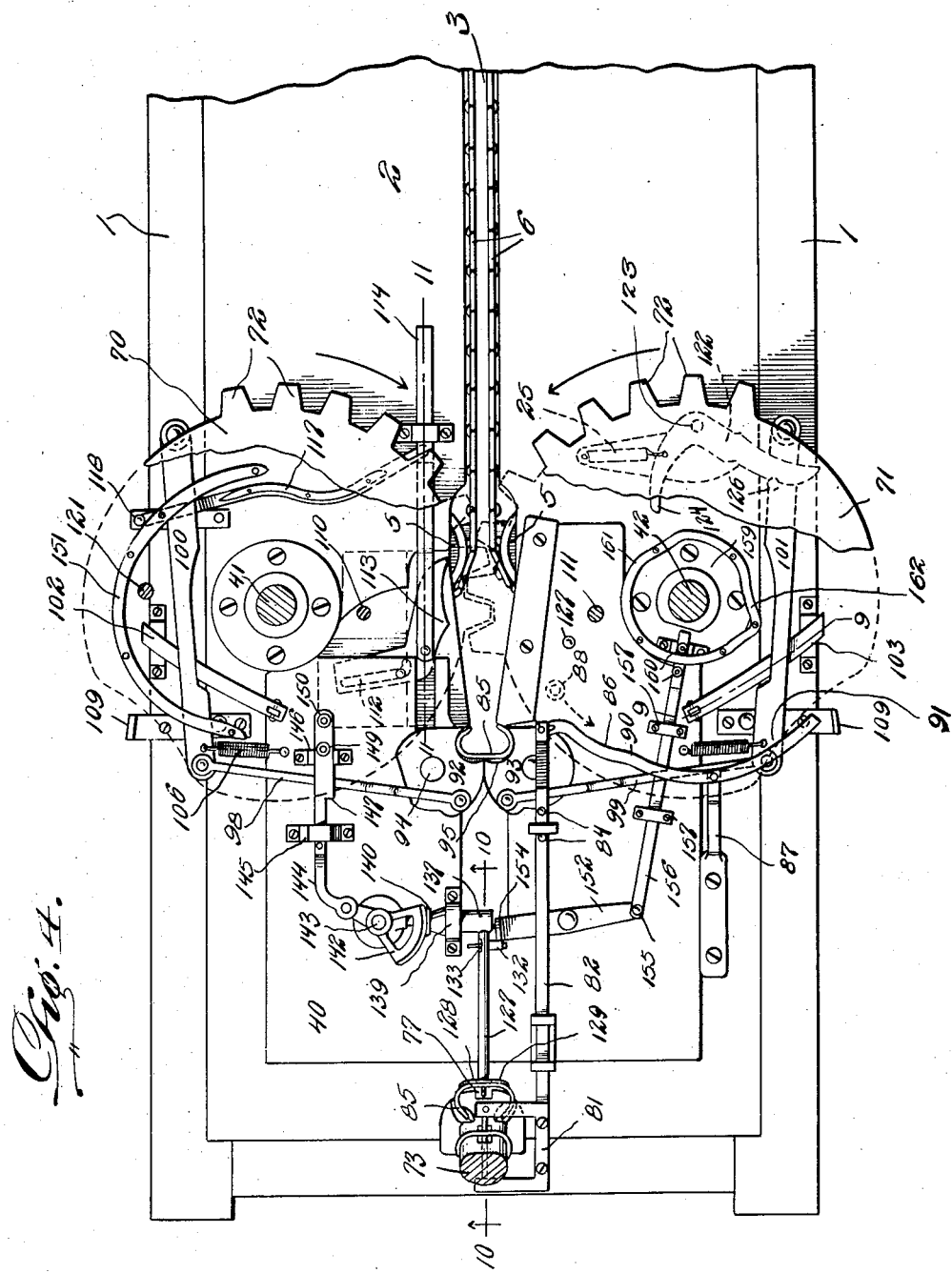

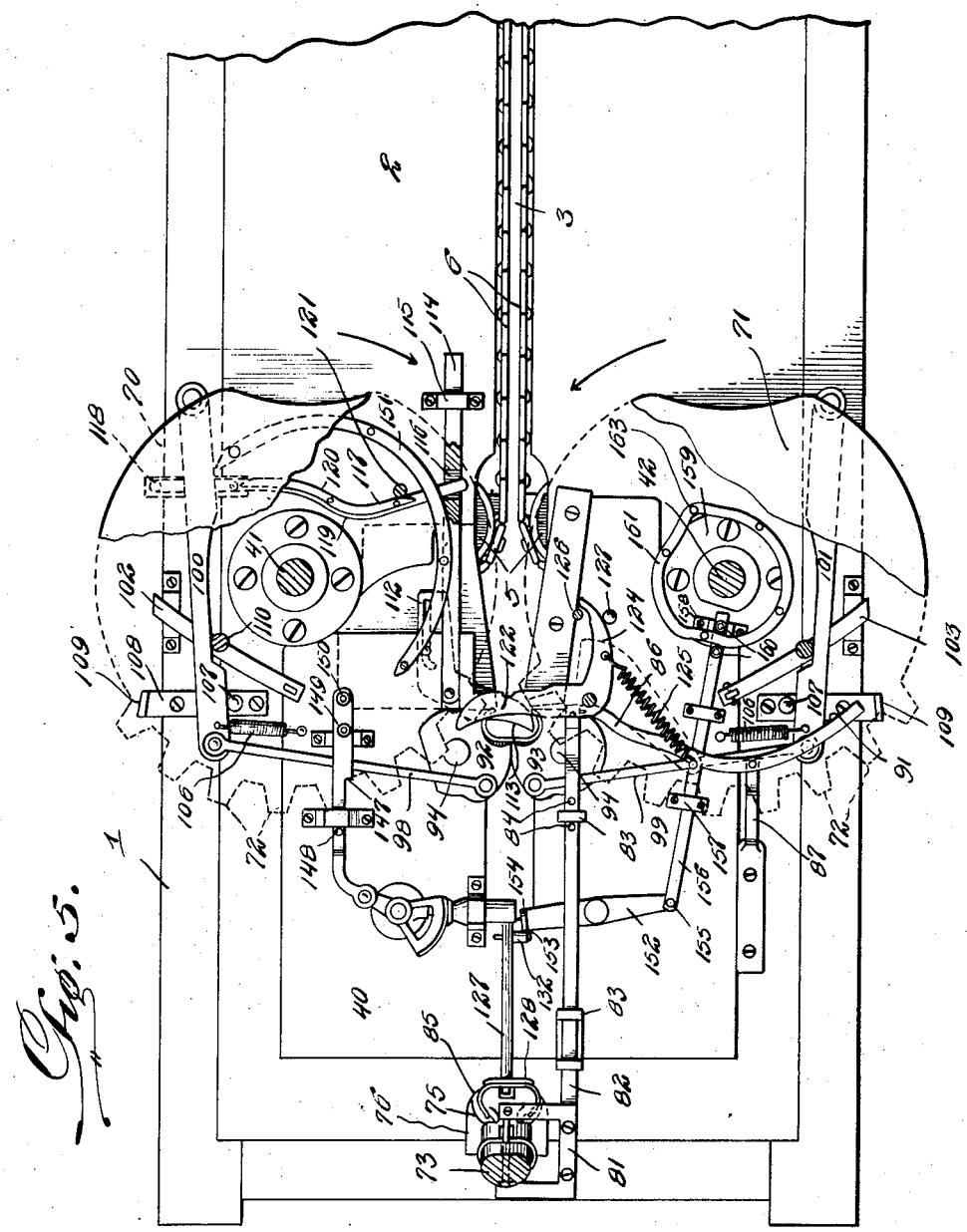

Aug. 25, 1925.
O. O. HAMER
1,551,525
BAG SEALING MACHINE
Filed June 10, 1921  10 Sheets-Sheet 5
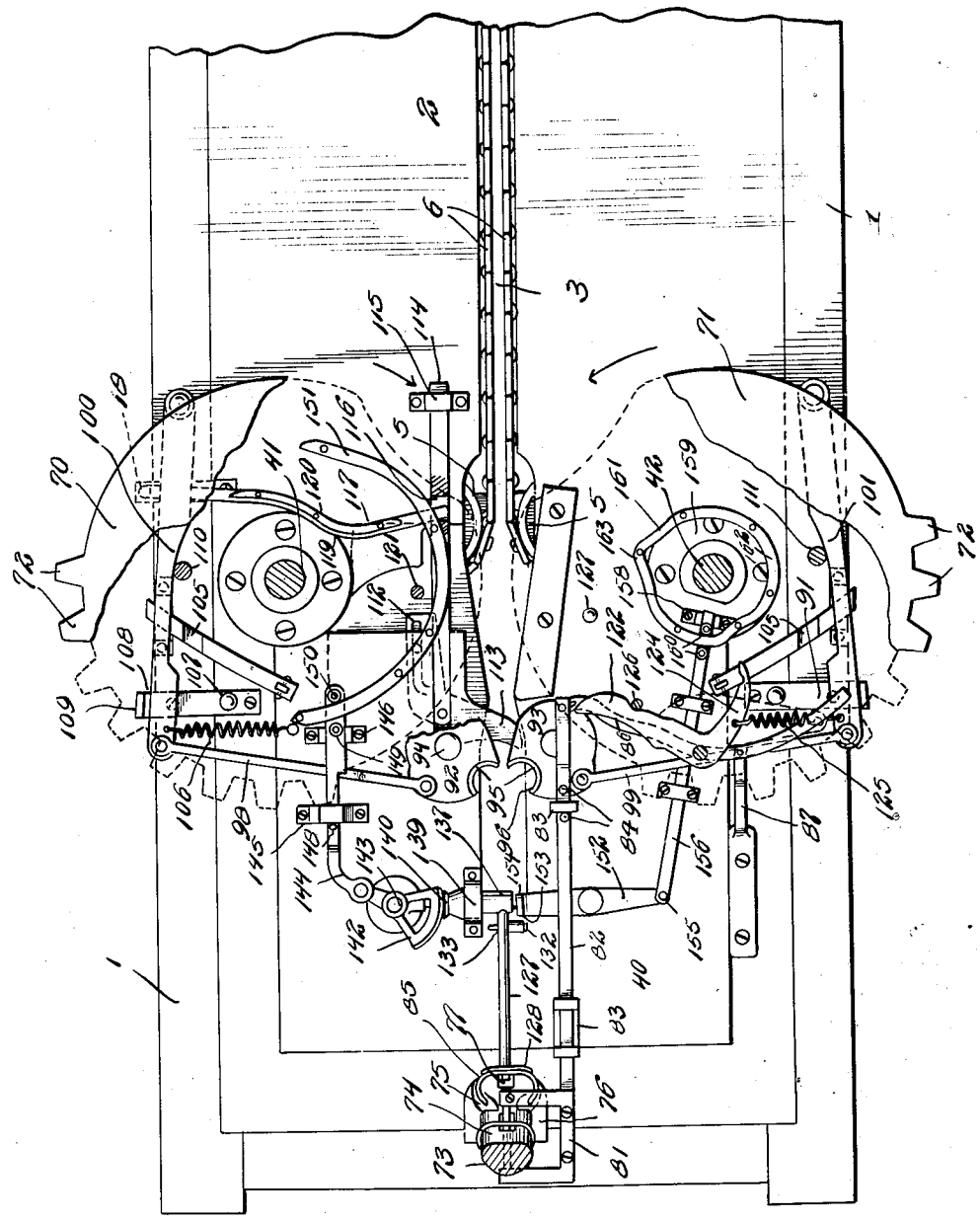
O. O. Hamer,
INVENTOR
BY Victor J. Evans.
ATTORNEY
WITNESSES:

Aug. 25, 1925.

O. O. HAMER

BAG SEALING MACHINE

Filed June 10, 1921

O. O. Hamer.
INVENTOR
BY Victor J. Evans.
ATTORNEY

Aug. 25, 1925.
O. O. HAMER
1,551,525
BAG SEALING MACHINE
Filed June 10, 1921
10 Sheets-Sheet 7
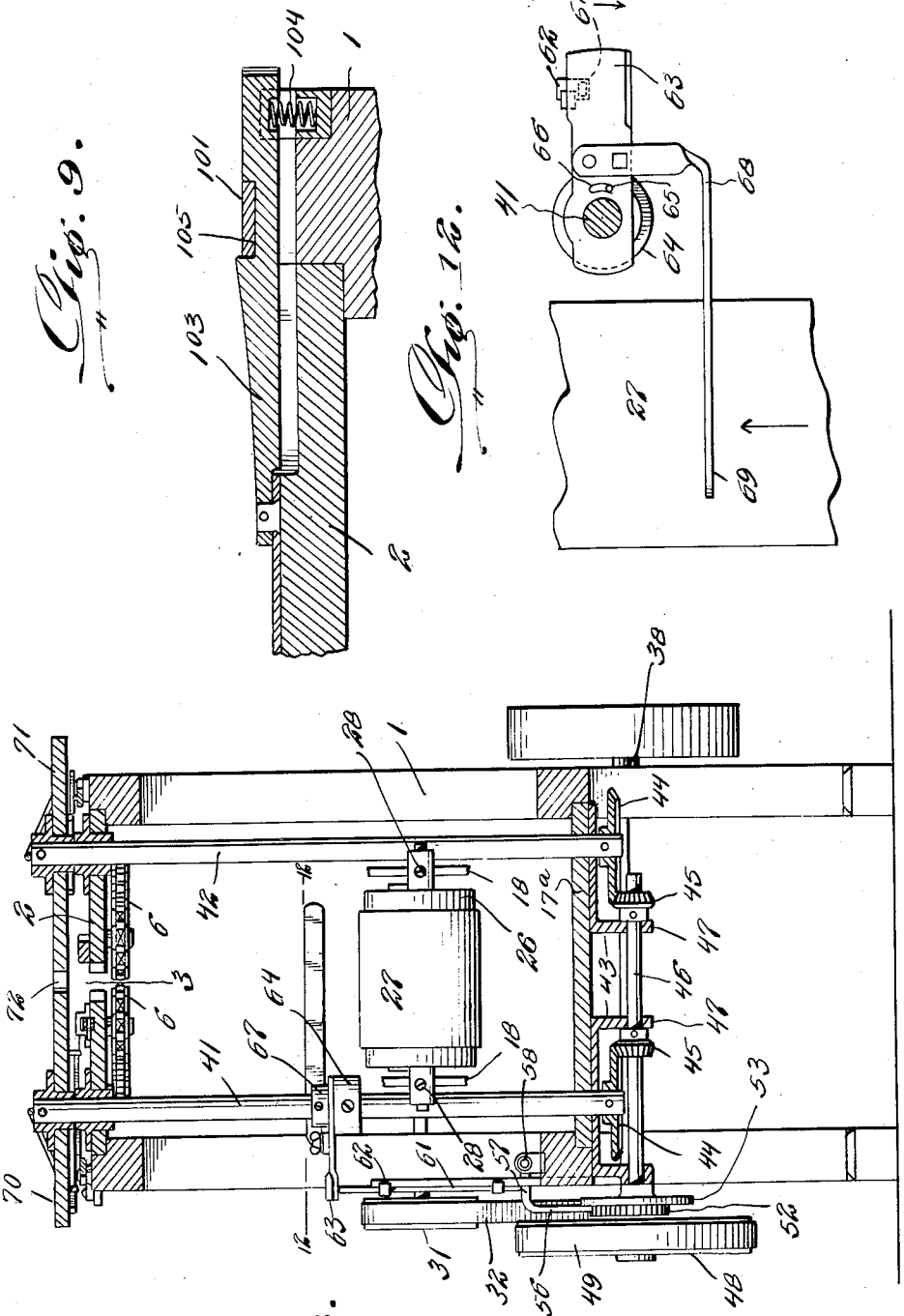

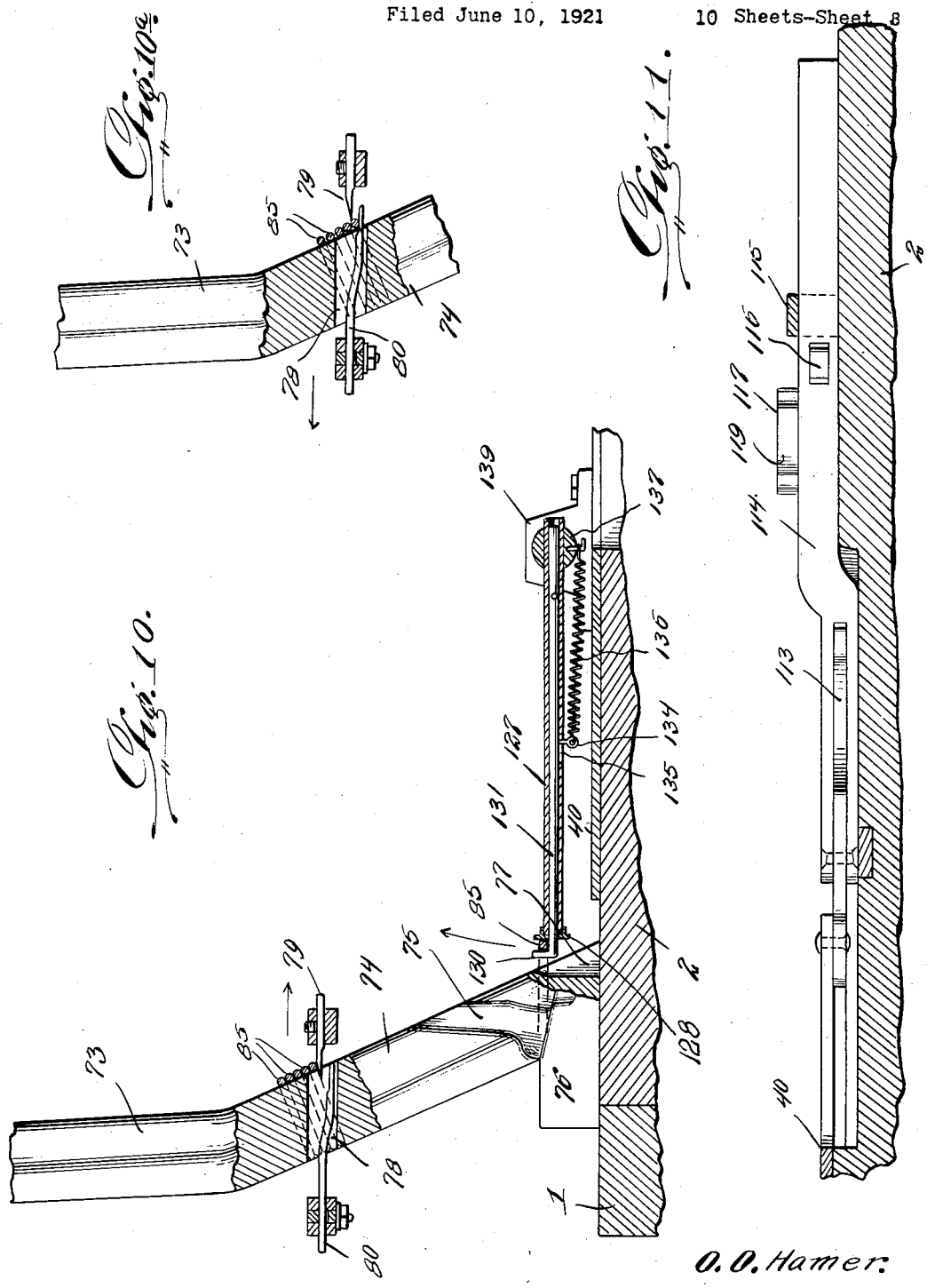

Aug. 25, 1925.
O. O. HAMER
1,551,525
BAG SEALING MACHINE
Filed June 10, 1921      10 Sheets-Sheet 9
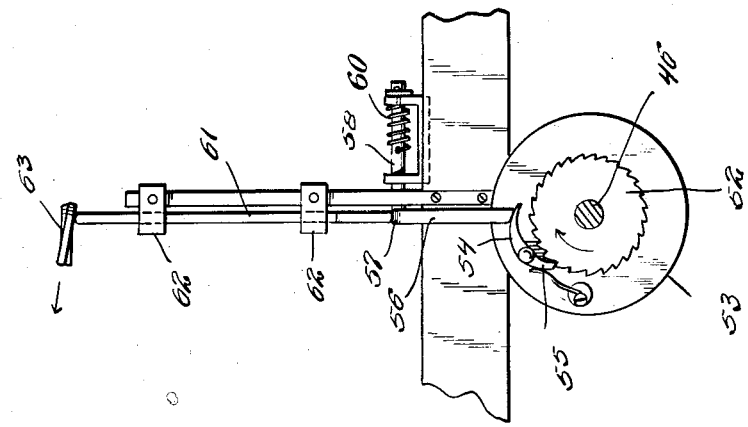
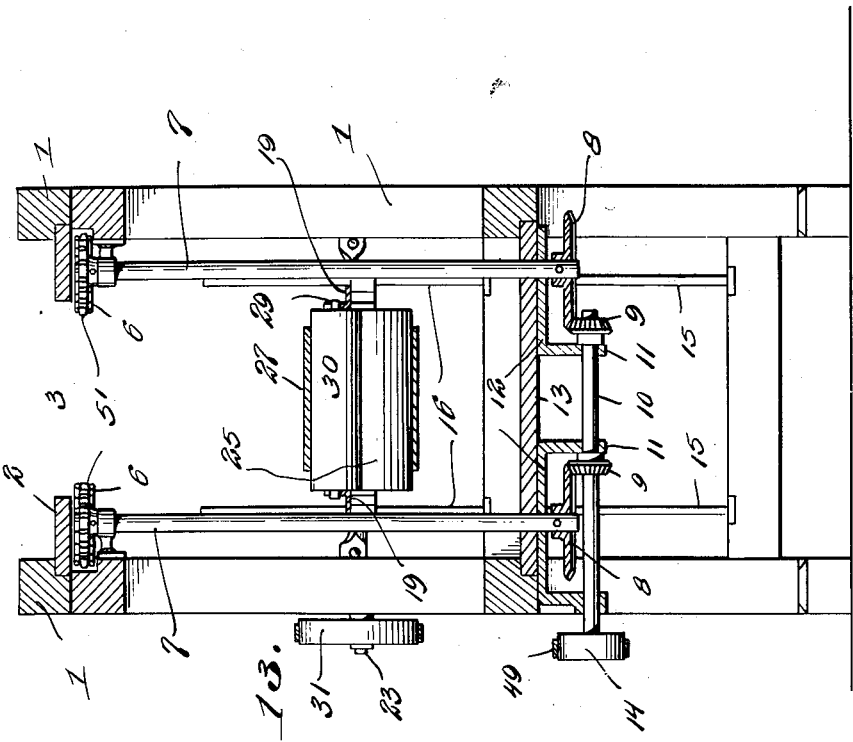
O. O. Hamer,
INVENTOR
BY Victor J. Evans.
ATTORNEY Aug. 25, 1925.
O. O. HAMER
1,551,525
BAG SEALING MACHINE
Filed June 10, 1921   10 Sheets-Sheet 10
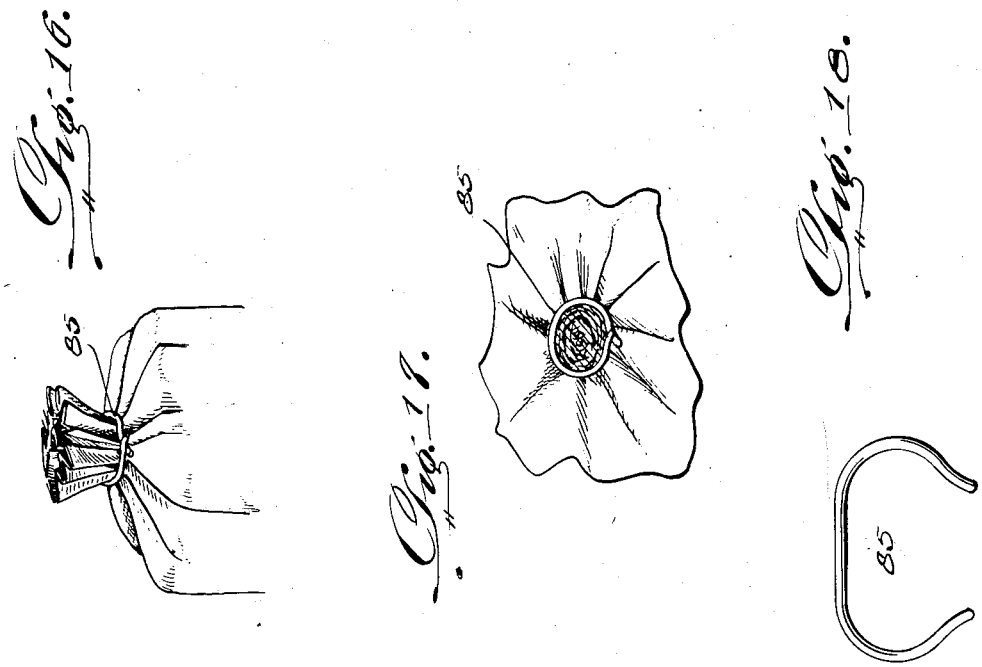
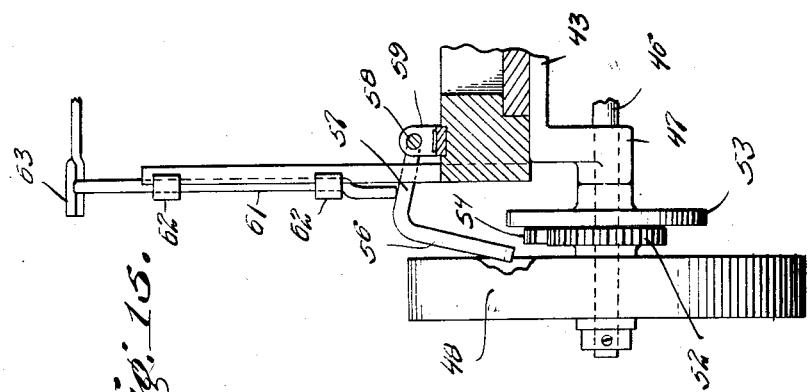
O. O. Hamer,
INVENTOR
BY Victor J. Evans
ATTORNEY
WITNESSES:

Patented Aug. 25, 1925.

1,551,525

UNITED STATES PATENT OFFICE.

ORTELL O. HAMER, OF HASTINGS, MINNESOTA, ASSIGNOR, BY DIRECT AND MESNE ASSIGNMENTS, TO ORION PAPER BAG CLOSING MACHINE COMPANY, A CORPORATION OF MINNESOTA.

BAG-SEALING MACHINE.

Application filed June 10, 1921. Serial No. 476,555.

*To all whom it may concern:*

Be it known that I, ORTELL O. HAMER, a citizen of the United States, residing at Hastings, in the county of Dakota and State of Minnesota, have invented new and useful Improvements in Bag-Sealing Machines, of which the following is a specification.

This invention has reference to a bag sealing machine. In many establishments, bags are filled with material and afterward closed and provided with a fastener so that they can be handled and marketed. One type of establishments so handling bags is that comprising milling establishments such as prepare and package various kinds of flour, corn meal, etc. In such mills the bags are filled by suitable means and contain the desired amount of material and are then provided with a fastening means placed about the folded or crimped and compressed neck of the bag. Such bags are commonly made of rather stiff paper, although the present invention contemplates the use of bags of various materials. The closing and sealing of such bags has heretofore largely been done by hand and such attempts as has been made to do this work with machinery have required the presence of various attendants to operate the machine.

It is an object of this invention, therefore, to provide a machine on which the filled bags may successively be placed and carried along the other part of the machine, comprising means for folding, crimping, and gathering the sides of the bag to substantially cylindrical form and then placing a fastener about said sides or neck of the bag. This fastener comprises a member of bendable material, which material is, however, sufficiently rigid and stiff to retain the position into which it is bent so that when bent around the neck of the bag it will hold the same in closed and sealed position without having its ends locked or secured together in any manner.

It is another object of the invention to produce a machine having an endless conveyor on which filled bags are placed for delivery on to a receiving conveyor, such bags, immediately prior to such delivery having their mouths crimped or folded and sealed by a split metallic ring.

A further object is the production of a bag sealing machine in which the bags themselves operate to set the mechanism for crimping or folding the necks of the bags to arrange the same in a position to receive therearound a split ring which is compressed by said mechanism on the neck of the bag.

A still further object is the production of mechanism for sealing the mouths of bags by clamping a split ring therearound, and in which the parts are so positioned and timed as to prevent more than one bag being engaged by the sealing means during a single operation.

A further object is the production of a bag sealing means which comprise comparatively simple parts, so associated as to operate in timed relation to each other, and designed to engage the neck of a bag to crimp and compress the same, said mechanism including pivotally supported notched members that receive therein the compressed neck of the bag, holding the same in a position to receive therearound a split ring, delivered by suitable means, and whereafter the said pivoted members are further rotated to compress the ring around the neck of the bag and further permit of the actuation of the bag conveying means so that the sealed bag is delivered on to a receiving conveyor, and the mechanism returned to position to again engage with the next bag on the delivery conveyor.

A still further object is to produce a bag sealing machine in which an endless conveyor delivers bags to means for crimping and compressing the necks of the bags and for clamping split rings therearound to effectively seal the bags, and wherein such conveyor is vertically adjusted so that bags of varying heights may be sealed by the machine.

A still further object is to produce a bag sealing machine which is of a comparatively simple construction, automatic in operation, and positive in action.

The foregoing, and many other objects which will present themselves as the nature of the invention is better understood, may be accomplished by a construction, combination and operative association of parts, such as is disclosed by the drawings which accompany and which form part of this specification. The nature of the invention is such as to necessarily render the same susceptible to changes and modifications, and it is therefore to be understood that the drawings and description have reference only to a satisfactory embodiment of the improvement.

In the drawings:—

Figure 1 is a plan view of a bag sealing machine in accordance with this invention.

Figure 2 is a horizontal sectional view on the line 2—2 of Figure 3.

Figure 3 is a view of the machine in side elevation, as seen from the upper side of Fig. 1.

Figure 7:
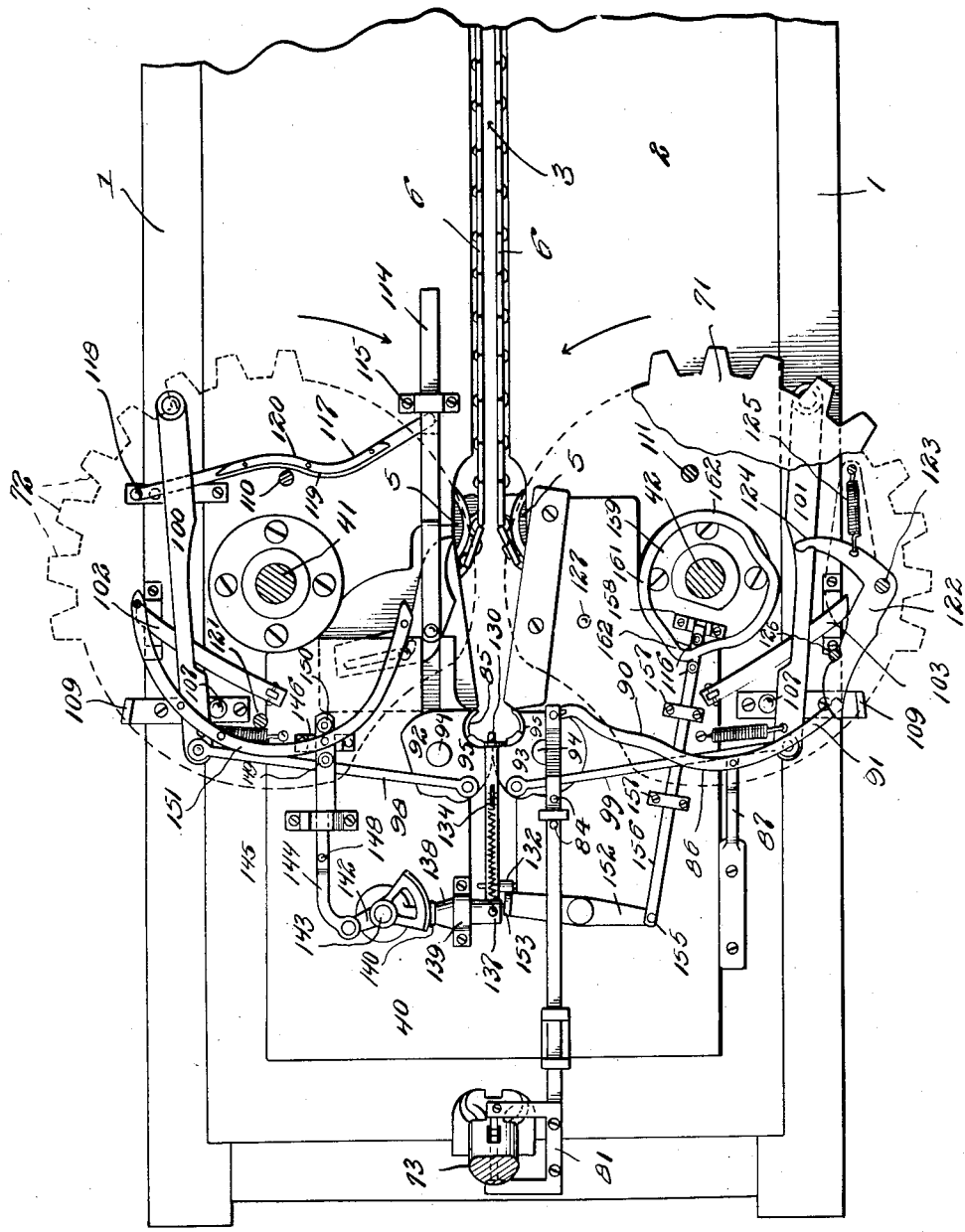

Figs. 4, 5, 6 and 7 are enlarged plan views looking toward the head end of the frame and showing the different relation of parts of the crimping, compressing and sealing means for the bag, from the time the bag is delivered to the crimping means from the compressing means, and just prior to the operation of the latter in securing the ring to the neck of the bag, parts being broken away, parts being in section, and other parts being indicated by the dotted lines.

Figure 8 is a vertical transverse sectional view on the line 8—8 of Figure 3.

Figure 9 is an enlarged sectional view on the line 9—9 of Figure 4.

Figure 10 is a similar sectional view on the line 10—10 of Figure 4.

Figure 10$^a$ is a fragmentary elevation, with parts in section showing the manner in which the split rings are singly fed.

Figure 11 is an enlarged sectional view on the line 11—11 of Figure 4.

Figure 12 is a sectional view, on an enlarged scale, and on the line 12—12 of Figure 8.

Figure 13 is a sectional view on the line 13—13 of Figure 1.

Figure 14 is a fragmentary sectional elevation of the clutch mechanism for stopping the bag conveyor when actuated by a bag thereon to hold the bag in a position to receive the split ring.

Figure 15 is a view taken at right angles to Figure 14, parts being broken away and parts being in section.

Figure 16 is a perspective view of the bag sealed in accordance with this invention.

Figure 17 is a sectional view through the neck of the bag taken directly above the sealing means.

Figure 18 is a plan view of the split ring.

In the drawings, like parts are designated by similar characters throughout the several views, and as disclosed therein, I make use of a substantially rectangular frame or table 1. The top 2 of the table has the bag sealing means arranged at one end thereof, and for distinction, I will hereinafter refer to the said end as the head portion of the table. The top 2, from the head portion thereof has a central slot or opening 3 therethrough. The portion of the opening, for a distance from the said head is restricted, the walls provided thereby being parallel, but from thence to the end of the table which I will hereinafter refer to as the rear thereof, the slot is gradually increased in width. Thus the outer portion of the slot from the rear of the table is substantially V-shaped, and this portion, for distinction, is indicated by the numeral 4. On the bottom of the table top, at the ends of the slot and at the juncture of the angle and parallel walls provided by the slot there are sprocket wheels 5. These wheels 5 are slightly projected into the slot, and have trained therearound sprocket chains 6 respectively. The rear ends of these chains 6 are guided by sprocket wheels 5', also on the under face of the table top. The inner and confronting links of the chains 6 are received in the slot and serve as means for properly directing the sacks or bags longitudinally through the slot of the frame to the mechanism which engages the necks of the bags for crimping, compressing and sealing the bags. The sprocket wheels 5' at the rear end of the table are keyed to depending shafts 7, the remaining sprocket wheels being journaled on stub shafts. The shafts 7 have their lower portions journaled in suitable bearing brackets which are supported by a transverse cleat adjacent to the bottom of the frame for the table, and on the ends of the said shafts there are keyed gears 8 which are in mesh with pinions 9 keyed upon a transverse shaft 10 that is also journaled in depending portions or ears 11 provided on the referred to brackets. For distinction, these brackets are indicated by the numeral 12 and the cleat supporting the same by the numeral 13. On one end of the shaft 10 there is a pulley 14 around which there is trained a belt that receives motion from suitable means which will hereinafter be described.

At the rear end of the frame for the table there are secured rod members 15 which extend horizontally in an outward direction therefrom, the said rods being arranged in pairs and disposed slightly above the cleat 13. These rods have their outer ends bent or otherwise formed with vertical extensions 16. The extensions 16 are really in the nature of posts or standards, and in parallel relation to the said posts or standards there are secured on a transverse cleat 17 between the side members of the frame, at the head end thereof, similar posts 18.

The endless bag conveyor includes a frame which has its sides preferably constructed of angle irons 19. The angle irons 19 are suitably connected by transverse members 20 secured to their lower horizontal flanges and each of the members 19 has its ends formed with an extension in the nature of a block or enlargement. Each block or enlargement, at the outer end thereof has a transverse tubular bore 21 therethrough and a rib or post 22 connecting the said enlargement with the angle members proper. The tubular portions 21 provide bearings for shafts 23 and 24 respectively on which are keyed or otherwise secured rollers 25 and 26 respectively around which are trained the fabric body 27 of the conveyor. The bosses 22 are provided with vertical openings that receive therethrough the respective posts 16 and 18, each boss having a threaded opening for the reception of a binding screw 28, and whereby the conveyor frame may be vertically adjusted on the posts with respect to the top of the table. In this manner bags varying in height may be sealed by the device in a manner which will be presently apparent. The vertical sides of the angle irons 19, that constitute the sides of the conveyor frame are provided with aligning notches that enter from their upper edges, the said notches providing bearings for short shafts or trunnions 29 on the ends of rollers 30, and on these rollers the upper lead of the fabric body 27 of the conveyor rests. Thus the upper lead of the conveyor is at all times firmly supported and sustained horizontally with respect to the machine.

The shaft 23 for the bag or sack conveyor, which is arranged beyond the rear end of the supporting frame for the table is extended toward the side of the frame on which the pulley 14 is arranged, and has secured thereon a pulley 31 of a somewhat greater diameter than the pulley 14, and around the pulley 31 there is trained a belt 32 that is likewise trained around a second pulley 33 on the end of a shaft 34 that is journaled in suitable bearings 36ª on the longitudinal side members below the top of the frame. Keyed on this shaft 34 there is a toothed wheel 36 which is in mesh with a similar toothed wheel 37 secured on the power shaft 38. The power shaft is journaled in bearings 39ª depending from the referred to side members of the frame, and power is imparted to the shaft 38 from any desired source (not shown). Because of the difference in size of the toothed wheels 37 and 36 the bag conveyor will be caused to travel at a greatly reduced speed with respect to the turning of the power shaft.

The portion of the table which I have referred to as the head thereof has the restricted slot 3 entering the same for a predetermined distance, and has bolted or otherwise secured thereon a table 40, having a slot therethrough aligning with the slot in the table. The table 40 provides the bed for the mechanism hereinafter to be described.

Passing through opposite bearing openings in the table 40 and in the head portion of the table, slightly to the rear, and to the opposite sides of the inner sprocket wheels 5 are shafts 41 and 42 respectively. The shafts also pass through bearing openings in a transverse plate or cleat 17ª disposed opposite the cleat 17, finding bearings in brackets 43 that are secured on the last mentioned cleat. On the lower ends of the shafts 41 and 42 there are keyed or otherwise secured bevel gears 44 respectively which are in mesh with similar gears 45 keyed on a transverse shaft 46 journaled in bearings in depending ears 47 on the said brackets 43. On one end of the shaft 46 there is mounted a pulley wheel 48 around which is trained a belt 49 that is also trained around the pulleys 14 and 39, the lower lead of the belt being trained over a guide pulley 50 which is really in the nature of a belt tightener and which is journaled on a suitable shaft that is secured on a depending plate or bracket 51 secured to one of the side members of the frame. Thus it will be noted that the turning of the power shaft 38 imparts motion to the bag conveyor, the directing sprocket chains for the bag and the shafts 41 and 42.

The free mounted pulley wheel 48 has secured on the inner end of the hub thereof a ratchet wheel 52. On the shaft 46, opposite the ratchet wheel there is keyed or otherwise secured a disk 53. The disk carries a pivoted pawl 54 influeced by a spring 55 to engagement with the ratchet wheel 52, and thus locks the pulley wheel 48 to the shaft 46. It is necessary that the shafts 41 and 42 which actuate the crimping and sealing means only operate when the bag to be crimped and sealed is in correct position relative to the crimping and sealing means. For this reason, the clutch means between the pulley 48 and the shaft 46 which operates the shafts 41 and 42 is provided so that the latter shafts may be actuated at the proper time.

The clutch mechanism further includes a trigger member comprising a straight portion or arm 56 that is in the path of movement of the arched tail portion of the pawl 54. The arm 56 has an inwardly directed angular extension 57 that terminates in a right angular portion 58, the same being round in cross section and being journaled in suitable bearings 59 on the referred to side member of the frame. Between the bearings and the rounded portion of the trigger there is a spring 60 that tends to force the arms 56 out of engagement with the pawl 54. The portion 57 of the trigger provides a shoulder on which there at all times rests a vertically disposed bar 61 suitably supported by guide means 62 and which has its upper end in the path of engagement with a wiper plate 63 that is connected to the shaft 41. The bar 61 is in the nature of a presser member, and the wiper plate 63 has the portion thereof which engages with the said presser bar arranged at an angle, and it will be apparent that when the wiper plate is brought over the presser bar the latter will influence the trigger to bring the arm 56 thereof to engage with the tail of the pawl, and lift the pawl against the influence of its spring out of engagement with the ratchet wheel 52, and thus release the wheel 48 from engagement with the shaft. The wiper plate 63 is freely arranged on the shaft 41 proper, but rests upon a collar or enlargement 64 on the said shaft, the said collar having secured thereto an upstanding pin 65 that is received through a somewhat elongated opening 66 in the wiper plate 63. On the shaft 41, and over the wiper plate there is a collar 67 which holds the wiper plate against upward vertical movement, and secured on the upper face of the said wiper plate there is the inner angle end 68 of a contact arm 69, the latter being normally arranged transversely over the bag conveyor. A bag on the conveyor, brought to engage with the contact arm 69 will turn the wiper plate on the shaft, the slot or opening 66 in the said plate limiting the swinging of the same, but such swinging is sufficient to bring the plate out of engagement with the presser bar 61, and permitting the spring influenced trigger to be brought out of engagement with the pawl 54, again permitting the spring 55 of the said pawl to swing the same to engage with the ratchet wheel 52, and again lock the pulley wheel 48 to the shaft 46.

On the upper ends of the shafts 41 and 42, above the table 40 there are removably secured flat wheels 70 and 71 respectively. Each wheel 70 and 71 has its periphery formed, for a predetermined length, with outstanding teeth 72, the said teeth designed to mesh when the shafts 41 and 42 are revolved and to engage therebetween the bag, to crimp the neck thereof, one bag having its neck received in the ring holding and bag neck compressing means, when the adjacent or succeeding bag on the conveyor is in a position to be engaged by the toothed crimping means. The wheels 70 and 71, in addition to crimping and assisting in delivering the bags to the compressing and ring holding means serve to actuate the mechanism employed in sealing the bag.

Secured on the table top to the rear of the bed plate, and approximately in a line with the axial center of the slot in the said bed plate, is an upstanding split ring holding member 73. This member is preferably in the nature of a solid rod, having its outer portion vertically straight and its lower portion, which is connected to the table, disposed at an inward angle, the last mentioned portion, for distinction, being indicated by the numeral 74. The portion 74 has its sides, adjacent to its lower end provided with vertically directed notches 75, the inner walls of the said notches being preferably inclined, and the lower walls communicating with the base block 76 for the holder member. The lower end of the angle portion 74 is centrally provided with a vertical groove 77, and the said portion 74, above the notches 75 has a transverse opening 78 therethrough. Entering the opening 78, from the opposite sides of the member 73, and disposed one above the other, are pointed fingers 79 and 80 respectively. These fingers are secured upon the parallel arms of a substantially U-shaped member 81 which in turn is secured to a rod 82 arranged for reciprocatory movement through upstanding guides 83 supported from the bed plate, the reciprocatory movement of the said rod being limited by stops 84—84 which contact with one of the guides 83. The mechanism employed for actuating the rod will presently be described. The fingers 79 and 80 are arranged one above the other a distance equalling or slightly in excess of the thickness of the split rings 85 which are arranged upon the holder 73. Also the finger 79, which is disposed opposite the inner face of the member 73, is normally received in the opening 78, the fingers 80 being out of said opening, whereby the suspended rings are canted on the angle end 74 of the member 73, being suspended from the said fingers 79. A movement of the rod 82 inwardly with respect to the table, or in the direction of the wheels 70—71, will bring the finger 79 out of the opening 78, and the finger 80 therethrough, thus permitting one of the split rings to drop off of the finger 78 on to the finger 80. A reverse movement of the rod 82 permits of the ring held thereby gravitating on the angle end 74 of the member 73 and the ends thereof being received in the notches 75, in a position to be engaged by the gripping and conveying means which delivers the said ring around the crimped and compressed neck of the bag to the supporting and compressing means for the ring.

The rod 82 has its inner end, or the end thereof opposite that provided with the member 81 arranged at a downward angle toward the wheel 71, and to the angle end of the said rod there is pivoted a curved rocker arm 86 disposed over the wheel 71, and pivotally supported by a bracket 87 that is secured either to the bed plate or to the table top. The rocker arm is in the path of movement of a roller 88 that is mounted on an upstanding stud 89 on the wheel 71. The rocker arm 86 is so formed as to provide two surfaces which are engaged by the roller when the wheel 71 is revolved, one surface, indicated by the numeral 90 being disposed at its pivoted connection with the rod 82, and when this surface is contacted by the roller, the rod 82 is moved longitudinally in a rearward direction, bringing the finger 79 into the opening 78 of the member 73. The second contact surface is indicated by the numeral 91, and is disposed adjacent to the end of the rocker member 86 outward of its pivotal connection with the bracket 87. When this surface is engaged by the roller, the rod 82 will be moved longitudinally in an opposite direction, bringing the finger 80 through the opening 78 and the finger 79 out of said opening. Means is provided which receives the crimped and compressed necks of the bags and which also compresses the rings around the bag necks, comprising opposed members in the nature of flat disks 92 and 93 respectively. The disks are pivoted, as at 94 to the bed plate and have their peripheries received in the slot in said bed plate. The disks are arranged adjacent to the rear edge of the wheels 70 and 71, and each disk is peripherally formed with a semi-cylindrical notch 95, the walls of which being provided, adjacent to their lower edges with shoulders 96, and on these shoulders the rings 85 are received and rest.

Eccentrically pivoted, as at 97 to the respective disks 92 and 93, are rods 98 and 99. These rods are directed toward the sides of the table, and are each pivotally connected to spring influenced bars 100 and 101 respectively. The bars 100 and 101 are disposed longitudinally of the table, being arranged beneath the respective wheels 70 and 71, and the said bars are normally held in one position by latching means 102 and 103 respectively. The latch members 102 and 103 are in the nature of tracks, each comprising a flat plate that is gradually thickened from one of its ends to its opposite end, the reduced ends being pivotally secured to upstanding lugs on the bed plate, and the widened ends being influenced in the direction of the bars 100 and 101 by springs 104 respectively. Each latch 102 and 103 is notched, as at 105 to receive the bars 100 and 101, and thus hold the bars against the influence of their springs 106 respectively. The springs 106 influence the bars 100 and 101 inwardly with respect to the bed plate, but the inward movement of the said bars is not only limited by the bars being received in the notches of the latch plates but by additional stop means 107 formed on the inner ends of plates 108 respectively that are secured to the table top, the outer ends of the said plates being offset to provide stops 109 that limit the outward swinging of the bars 100 and 101.

On the under face of the wheels 70 and 71 there are depending pins 110 and 111 respectively. These pins are designed to ride over the inclined latch members 102 and 103 respectively, to first depress the said tracks against the influence of their springs and thereafter to contact with the inner edges of the bars 100 and 101, to swing the said bars outwardly against the influence of their springs and, through the medium of the rods 98 and 99, to revolve the disks 92 and 93 to cause the same to act upon the split rings received in the shouldered notches thereof and compress the rings around the neck of the bag. When the pins ride off of the bars 100 and 101 the springs of the latches and the springs that influence the bars will return these parts to their initial position and consequently will influence the rods 98 and 99 to turn the disks 92 and 93 to bring the notches thereof in a line with the slot in the bed plate and in a position to again receive a split ring therein.

To compress the neck of the bag in the notches of the disks, after the same has been crimped, as above described, I mount below the inner edge of the bed plate, forward of the disk 92, the slotted arm 112 of a curved finger 113. This finger, when moved to one position is designed to be projected through the slot in both the table top and bed plate and to be further moved in the direction of the disks 92 and 93. The means for accomplishing this includes a rocker bar 114 which is pivotally connected to the finger and which is received in guide means 115 on the table to one side of the slot. The bar 114 has a transverse slot or opening therethrough in which is received the reduced or fingered end 116 of a curved track 117 that has its outer end pivotally supported, as at 118 on the table top below the wheel 70. This track has an inner contact surface 119 which is substantially arched in plan, and an outer contact surface 120 arranged angularly with respect to the surface 119. On the inner face of the wheel 70 there is a depending pin 121 designed, when the wheel 70 is turned, to engage with the contact surface 120 to move the track in the direction of the disks, and throw the finger 113 to bag neck compressing position. The inner contact surface 119 is engaged by the pin 110 on the said wheel 70, and moves the rocker bar 114 in an opposite direction returning the compressing finger to its initial position after the pin has operated the bar 100 in a manner as previously described.

On the under face of the wheel 71 there is a second bag neck compressing finger 122. This finger is pivoted, as at 123 and is provided with an angle tail portion 124 which is engaged by a spring 125 that normally holds the finger in engagement with the stop member 126 on the said under face of the wheel 71. The tail portion of the finger is arranged in the path of contact with an upstanding pin 127 arranged on the table below the said wheel 71. The finger 122 operates above but in unison with the finger 113, so that the neck of the bag is engaged at two distinct points and forcibly compressed in the notches of the disks 92 and 93.

The means which deliver the split rings 85 singly from the holder member 73 to the compressing jaws provided by the notched portions of the disks 92 and 93, includes a tubular member 127 that has at one of its ends, an arched head portion 128. The head comprises oppositely extending arms to provide the same with a pocket in which the body portion of the split ring rests when received from the holder 73. The flange 129 is centrally cut away to provide for the hooked end 130 of the gripping rod 131 for the ring. The rod is arranged in the tubular member 127, having at or adjacent its inner end a laterally extending pin or stud 132 that projects through an elongated slot 133 in the tubular member 127. In addition to the lateral stud 132 the rod 131 has its under face provided with an eye 134 that passes through a second elongated slot 135 in the tubular member 127, and this eye is engaged by a spring 136 which is secured to the inner or hub portion 137 of the tubular member 127. The spring, of course, normally moves the rod inward of the tubular member 127 so that the hook 130 is in contacting engagement with the inner face of the head 128, the said hooked end 130 being normally received in the groove 77 in the base 76 of the tubular member 73, when the device is in the position to receive one of the rings.

The hub 137 is arranged approximately centrally with respect to the slot in the bed plate, and has secured therein and projecting from one end thereof a shaft 138 that is journaled in a bearing 139 on the bed plate. On the inner end of the shaft 138 there is a comparatively small gear 140 which is engaged by teeth on the segmental end of a rocker member 142. The rocker member is approximately centrally supported, as at 143, and has pivotally connected to its outer end the angle and offset end of a longitudinally arranged bar or plate 144. The bar or plate 144 is received in guide means 145 and 146 secured to the bed plate, the last mentioned guide member being disposed beneath the wheel 70. The portion of the bar which extends through the guide means 145 is preferably reduced, providing the same with an inner shoulder 147 in the path of engagement with the said means 145, whereby to limit the reciprocatory movement of the bar 144 in one direction, the movement of the said bar in a second direction being limited by a stop 148 disposed to contact with the opposite side of the said guide means 145. The bar or plate, at or adjacent to the inner and free end thereof has mounted on upstanding studs revoluble sleeves 149—150 respectively, and the said sleeves receive therebetween an arched or curved track 151 on the under face of the wheel 70. The track 151 has contact surfaces for the sleeves 149 and 150, which are so arranged that during the crimping and compressing operations for the neck of the sack the tubular member or shaft 127 will be first moved to receive a split ring from the holder 73, and thereafter swung with the ring, through the operation of the mechanism just described to arrange the ring over the shouldered notches in the disks 92 and 93 around the neck of the bag to permit of the operation of the mechanism, heretofore described, for turning the said disks to compress the split ring around the bag neck. To operate the gripping rod 131 so that the hooked end thereof will be first moved outwardly from the head 128 to receive a ring in the flanged head, and thereafter grip the said ring to hold the same in the head when the tubular member 127 is being swung to deliver the ring to the ring compressing disks, I provide a rocker plate 152 which is approximately centrally pivoted to the bed plate diametrically opposite the rocker member 142. The inner end of the member 152 is formed with an upturned flange disposed opposite the hub 137, the said flange being in the nature of a contact member having its edges reduced and its corners rounded, and in reality providing two contact surfaces 153 and 154 respectively, both of which are designed to contact with the stud 132 on the rod 131. Such engagement, however, only occurs when the tubular member has its head 128 in a position to receive one of the split rings from the holder 73, and when the said tubular member is moved to bring the head carrying the split ring directly over the shouldered notches in the disks 92 and 93, to deliver the ring into the said notches. To accomplish such timed operation of the contacts on the rocker arm 152, I pivotally secure, as at 155 to the free end of the said member 152 a bar 156. The bar is mounted for slidable movement in suitable guides 157 secured on the bed plate, the inner guide, for distinction, being indicated by the numeral 158 and being in the nature of a plate having spaced upstanding flanges that receive the bar therebetween, the said plate being secured on the flanged base of a boss 159 on which the hub of the wheel 71 rests. The bar 156, adjacent the guide 158 has a pair of spaced upstanding lugs on which are arranged revoluble sleeves 160, and between these sleeves there is received a track 161 secured on the under face of the wheel 71. The track 161 includes a curved portion arranged between portions disposed approximately concentrically to the hub of the wheel 71, the said portion being indicated by the numeral 162, and this portion influences the sleeves to move the bar 156 toward the hub, and consequently swing the free end of the member 152 in the direction away from the wheel 71, causing the contact surface 153 to engage the stud 132 to move the rod 131 against the influence of its spring and to hold the hooked end 130 thereof outwardly with respect to the head 128 to permit of the ring gravitating into the flanged head. This occurs during the crimping and compressing of the bag neck, and the turning mechanism actuated by the wheel 70 for the ring delivery means is now in operation to swing the member 127 to bring the ring to a position to be received in the notches 95 of the disks 92 and 93. The swinging of the member 127 will bring the stud 132 out of engagement with the contact surface 153, thereby permitting the contraction of the spring which influences the gripping rod and causes the hooked end thereof to firmly grip the ring. When the head 128 of the member 127 has been brought directly over the notches 95 in the disks 92 and 93 a substantially angular portion 163 in the track 161, which is disposed further away from the center of the track and wheels, that is the portion 162, will ride between the sleeves 159 and 160 to move the bar 156 toward the rear end of the table, and consequently swing the rocker member 152 in a second direction to bring the contact surface 154 into engagement with the stud 132, this time to again move the rod outwardly from the tubular member 127 and bring the hooked end thereof away from engagement with the ring, permitting the ring to drop on to the shoulders 96 in the notched portions of the disks. The rocking mechanism for the tubular member 127 is now further actuated to return the member to its first mentioned position, that is to again receive a ring in the head thereof, and while in such position the wheels 70 and 71 are further turned by their respective shafts to cause the mechanism, above described to turn the disks 92 and 93 to bring the notched portions thereof toward each other, and consequently compress the split ring around the neck of the bag.

While the operation of the machine has been clearly indicated in the above description it may be described as follows:

The bags which have been filled and are to be sealed are placed on the rear end of the conveyor 27 and moved in upright position thereon toward the head portion of the machine. The necks of the bags will move between the chains 6 and as these chains converge toward the head of the table, the sides of the bag at the neck portion will be collapsed or moved toward each other and in this closely adjacent and parallel position will move through the slot 3 at the head of the table between said chains. When the bag being so moved reaches a position to engage with the arm 69 it will swing said arm and member 63 to move the latter off the end of the rod 61, thus allowing spring 60 to move the rod 56, 58 away from the tail of pawl 54, and allowing the spring engaging said pawl to move the same into engagement with ratchet 52. Shaft 46 will now be clutched to pulley 48 and shafts 41 and 42 turned, thus rotating or swinging the disks 70 and 71. At this time, these disks are in the position shown in Fig. 4 and as they swing toward the dotted line position shown in said figure, the neck of the bag will be engaged by the teeth 72 and the sides thereof brought into engagement and crimped between said teeth. The bag is continuously fed along and moves between said teeth and is movable along thereby in such crimped condition. At this time the members 92 and 93 are in the position shown in Fig. 4 and the crimped and folded convolutions of the bag are moved forward into the recess formed by said members in which recess the fastener 85 is held. As the last of the teeth 72 move in front of said recess, the curved fingers 113 and 122 are moved by their respective actuating means above described and act to move and compress the folded and crimped neck of the bag into the recess formed by the members 92 and 93, thus forming said neck into substantially cylindrical form. The disks 70 and 71 continue to revolve and the rods 98 and 99 are now actuated by said disks, as above described and the members 92 and 93 are revolved or swung about their respective pivots, thus moving from the position shown in Figs. 4 and 5 to the position shown in Fig. 6. By this turning movement of the members 93 and 94, the fastener held therein is compressed or clamped about the neck of the bag and, owing to its comparatively stiff nature, will hold the neck of the bag securely in its closed or sealed position. As said members swing, they move and eject the neck of the bag from the recess and the bag continues its travel past said mechanisms and is received from the conveyor 27 by any suitable means, as the conveyor 164, shown in Fig. 1. When the members 93 and 94 have moved to position to eject the neck of the bag, the operating means for the rods 98 and 99 is moved past the same and the springs 106 are allowed to retract members 100 and 101 and thus the rods 98 and 99 so that they again assume the position shown in Figs. 4 and 7. During the swinging movement of these members the member 152 has been actuated by the track 161 and the finger 130 moved to permit the fastener to drop at the rear thereof, which fastener has been released by movement of the bar 81 by its extension 82 operated by the member 86 in the movement of the disks 70 and 71. The track 151 now comes in position to act on the member 144 and the member 127 is swung in a vertical plane by the gear segment 142 and gear 140. The fastener is thus gripped by the portion 130 owing to the action of spring 136 and the same is carried over and placed in alinement with the recess in members 93 and 94, as shown in Fig. 7. Member 152 is now actuated to again move member 130 and release the fastener and track 151 then again actuates the gear segment 142 and the member 127 is swung back to the position shown in Figs. 4, 5 and 10 where another fastener will be delivered thereto in the next cycle of operation.

It will be understood that when the shaft 41 has made one revolution, that the teeth of pawl 54 will again come under the member 56. Arm 69 will rotate with shaft 41 and the plate 63 will again ride over the rod 61 so that the pawl 54 will thus be moved out of engagement with the ratchet wheel 52 and shaft 41 stopped until another bag contacts the arm 69 when the cycle of operations described will be repeated.

From the above description it is thought that the structure and action of applicant's machine will be clearly understood. The bags are continuously moved and perfectly sealed and the machine performs the operations described without the necessity of an operator in attendance at the time. The machine has been made and put into use and found to operate efficiently and successfully.

It will, of course, be understood that various changes may be made in the form, details and arrangement of the parts, as well as in the proportions thereof, without departing from the scope of applicant's invention, which, generally stated, consists in the method of sealing the bag described and in the apparatus used therefor, as set forth in the matter above described and in the appended claims.

Having thus described the invention, I claim:—

1. A bag sealing machine having in combination, means for holding a split ring and for delivering the neck of the bag into said ring, and means for compressing the ring around the neck of the said bag.

2. A machine of the class described having in combination, means for holding a fastener adapted to be bent around the neck of a bag to hold the same in sealed position solely by its rigidity, means for pressing the neck of a bag into said means, and means for moving said first mentioned means to cause the same to compress said fastener on said bag.

3. In a machine for the purpose set forth, means for supporting a split ring, means for delivering the neck of a filled bag into the ring, and means for operating the ring supporting means to cause the same to compress the ring around the bag neck.

4. In a machine for the purpose set forth, pivoted supporting means adapted to receive a split ring, means for delivering the neck of a bag into the ring, and means for actuating the supporting means to compress the ring around the bag neck.

5. In a machine for the purpose set forth, a plurality of co-operating supporting members adapted to receive a split ring therein, means for moving a bag to bring the neck thereof into the ring, and means for turning said members to cause the same to act upon and compress the ring around the neck of the bag, and to eject the neck of the bag.

6. In a machine for the purpose set forth, a holder adapted to receive split rings thereon, supporting means for the rings located away from said holder, means for delivering the rings singly to the supporting means, means for conveying a bag to bring the neck thereof into the supporting means and split ring therein, means for operating the supporting means to cause the same to act upon and compress the ring around the neck of the bag, and delivering means receiving the bag from the supporting means.

7. In a machine for the purpose set forth, a holder adapted to receive split rings thereon, a support comprising a pair of pivoted members for receiving the rings, means for delivering the rings singly from the holder on to the support, bag conveying means, means for forcing the neck of the bag into the support and ring, and means for swinging the ring supporting means to cause the same to clamp the ring around the bag neck and thereafter to move the bag therefrom.

8. In a machine for the purpose set forth, a ring holder adapted to receive split rings thereon, pivoted disks having flanged notches located away from the holder, means constructed and arranged to receive a single ring from the holder and deliver the same to the notched disks, bag conveying means below the disks, means for forcing the neck of a bag into the notches of the disks and ring therein, means for revolving the disks to cause the same to compress the ring around the bag neck and to eject the bag therefrom, and delivering means receiving the sealed bag.

9. In a machine for the purpose set forth, a split ring support, means holding the rings thereon, means operating said first means to bring the same to positions to permit the rings to gravitate singly on the support, receiving and delivering means for a released ring, disks having peripheral shouldered notches to receive the ring from the delivering means, bag conveying means, means for directing the neck of the bag into the notches of the disks, and means for turning the disks to cause the same to compress the ring around the neck of the bag and seal the bag, and for further moving the neck of the bag out of the disks.

10. In a machine for the purpose set forth, a split ring support, means holding the rings elevated thereon, susceptible to reciprocation whereby to permit the lower ring to gravitate on the support, operating means therefor, receiving and delivering means for the gravitated ring, disks having peripheral shouldered notches to receive the singly delivered rings, bag conveying means, guide means for the neck of the bag, means for compressing the bag neck in the notches of the disks, means for holding the disks against turning when receiving the bag neck, means for turning the disks to cause the same to compress the ring around the bag neck and for delivering the bag therefrom, and delivering means receiving the sealed bag.

11. In a machine for the purpose set forth, a bag conveying means, a split ring holder, means supporting the rings thereon, means for reciprocating said ring supporting means to permit the lower ring dropping below said holding means, means receiving the last mentioned ring, operating means for swinging said mentioned means, pivoted disks having flanged notches to receive thereon the split ring from said receiving means, guide means for the neck of the bag, means for compressing the neck into the notches of the disks, means for holding the disks against turning when receiving the bag neck, means for revolving the disks to cause the same to bend the split ring around the bag neck and for delivering the bag from between the disks, and delivering means receiving the sealed bag.

12. In a machine for the purpose set forth, endless bag conveying means, guide means for the neck of the bag, a support adapted to receive split rings thereon, means holding the rings elevated on the support, means for reciprocating said holding means to permit the lower ring dropping on the support, means receiving said last mentioned ring, means on said receiving means for gripping the ring, means for revolving said receiving and gripping means, pivoted cooperating disks having flanged notches for receiving the ring from said receiving and gripping means, means releasing the gripping means to allow the ring to drop into the notches of the disks, means compressing the bag neck in the notched disks, means revolving the disks to cause said disks to compress the ring around the bag neck and to deliver the bag from between the disks, and delivering means receiving the sealed bag.

13. In a machine for the purpose set forth, bag conveying means, guide means for the neck of the bag, operating means for said conveying and guide means, a split ring holder, means actuated by the operating means for singly arranging a ring thereon for removal therefrom, means also actuated by the operating means for first receiving and thereafter delivering the ring, pivoted notched disks provided with shouldered notches that receive the ring thereon from said ring receiving and delivery means, means actuated by the operating means for crimping the bag neck and for forcing the same into the notched disks, means for holding the disks against movement when in ring and bag neck receiving position, means actuated by the operating means for turning the disks to cause the same to compress the ring around the bag neck and for delivering the bag from between the disks, and delivering means receiving the sealed bag.

14. In a machine for the purpose set forth, a table having a slot in the top thereof which is widened at one end thereof, endless chains at the edges of the slot, an endless conveyor therebelow on which bags rest, operating means for the conveyor and chains, wheels each having a part of its periphery toothed and actuated by said operating means and the said toothed portions of the wheels when in engaging position designed to crimp the neck of the bag therebetween, cooperating pivoted disks having notches which are shouldered, a holder adapted to receive split rings thereon, means operated by one of the wheels for singly arranging the split rings in a position to be removed from the holder, means also operated by the wheels for receiving the said ring from the holder and delivering the same onto the notched disks, means operated by the wheels for compressing the bags in the notches of the disks, and means also operated by the wheels for turning the disks, to cause the same to compress the ring around the neck of the bag and to cause the bag to travel between the disks and to drop therefrom, and delivering means receiving said bags.

15. A bag sealing machine comprising opposite converging traveling means for moving the sides of the neck of the bag towards each other and opposed swinging means cooperating therewith to receive and crimp said neck of the bag.

16. A machine of the class described having crimping and folding means for the neck of a bag comprising opposed pivoted means having co-operating teeth between which the neck of the bag passes and overlapping oppositely swinging arms movable about vertical axes for engaging the crimped bag.

17. A machine of the class described comprising crimping and folding means having an open sided recess therein, a pair of pivoted swinging members having engaging teeth adapted to mesh in alinement with said recess to fold the neck of the bag and move the same into said recess, and opposed swinging means adapted to press said folded neck of the bag in said recess.

18. A machine of the class described having in combination, means for continuously progressing a series of bags, fastener placing means past which said bags are moved, and means for operating said last mentioned means to place a fastener about the neck of each bag as it moves past the same.

19. A machine of the class described having in combination, means for continuously progressing a series of bags, means for crimping the neck of each bag and gathering said crimps into a substantially cylindrical form past which the bags are moved, and means for operating said last mentioned means to so crimp and gather the neck of each bag as it moves past said latter means.

20. A machine of the class described having in combination means for continuously progressing a bag, means for moving the sides of the bag neck toward each other, means for crimping said sides together, and means including opposed swinging recessed arms for gathering said crimped sides into substantially cylindrical form and pressing a fastener about said gathered sides.

21. A machine of the class described comprising a pair of opposed pivoted members having notches therein adapted to co-operate in one position of said members to form an open sided recess, means for forcing the folded neck of a bag into said recess, and means for swinging said members to compress a fastener about said neck and eject the neck from said recess and notches.

22. A machine of the class described having in combination, a pair of opposed pivoted members having notches therein adapted to co-operate in one position of said members to form an open sided recess, a holder adapted to receive formed fasteners of wire or rod-like material, and means constructed and arranged to take a fastener from said holder and place the same in said recess.

23. A machine of the class described having in combination, means having therein an open sided recess, means for crimping the neck of a bag and forcing the same toward said recess, and means comprising oppositely swinging crescent shaped arms for pressing the crimped neck of the bag into said recess so that a fastener can be compressed thereabout.

24. In a machine of the class described, means for moving the sides of a bag neck toward each other comprising opposed traveling chains having rectilinear portions guided for converging movement.

25. A machine of the class described having in combination, means for continuously progressing a bag, intermittently operating means for crimping and folding the neck of said bag, and means for operating said second mentioned means in proper relation to the progressed bag to crimp and fold the neck of the same.

26. A machine of the class described having in combination, means for continuously progressing a bag, intermittently operating means for placing a fastener about the neck of said bag, and means for operating said last mentioned means in proper relation to the progressed bag to place a fastener thereon.

27. A machine of the class described having in combination, means for continuously progressing a bag, and means for placing a fastener about the neck of the bag to seal the same while said bag is in transit.

28. The method of handling a bag which consists in continuously progressing the same and during such progression, crimping and folding the neck thereof and compressing a fastener about said neck.

29. The method of sealing a bag which consists in continuously progressing the same and during such progression crimping and folding the neck thereof and sealing said neck by bending thereabout a fastener of wire or rod-like material of sufficient stiffness to retain its bent form and hold said neck in position.

30. The method of handling a bag which consists in progressing the same and while in transit moving the top portions of its sides in close substantially parallel relation, crimping said portion into successively folded convolutions, pressing said convolutions into substantially cylindrical form, and compressing a fastener about said side so crimped and pressed.

31. The method of handling a bag which consists in progressing the same while in transit, folding and gathering the neck of the same, and sealing it by bending thereabout a fastener of sufficient stiffness to remain in crimped position thereon.

32. The method of handling a bag which consists in progressing the same in vertical position and while in such position, folding, crimping and compressing the neck thereof and compressing about such neck a fastener of sufficient rigidity to retain its compressed form and hold the neck in closed position.

33. A machine of the class described having in combination, swinging means having therein an open sided recess, and opposed swinging arms for forcing the neck of a bag into said recess.

34. The structure set forth in claim 33, said arms having concave bag embracing recesses therein and overlapping to bring said recesses substantially into alinement when engaging said bag.

35. The method of handling a bag which consists in continuously progressing the same, during such progression, progressively bringing the sides of the neck thereof together and crimping and compressing said neck and then placing a fastener about said neck.

36. A bag closing machine having in combination, means for progressing a bag, endless flexible means traveling in converging paths for gradually and progressively bringing the sides of its neck portion together, means for crimping and compressing said side portions, and means for placing a fastener about said neck.

37. A bag closing machine having in combination, means for continuously progressing a bag, means for gradually bringing the sides of its neck portion together in a line during its progression, means for crimping and compressing said neck portion during such progression, and means for placing a fastener about said neck portion during such progression.

38. A bag closing machine having in combination, means for continuously progressing a bag in vertical position, means for folding, crimping and compressing the neck portion of said bag while in transit, and means for crimping about said neck portion while in transit a fastener of sufficient stiffness to retain its crimped position to hold the bag in closed position.

39. In a bag closing machine, means for progressing a bag and traveling flexible means for operating during such progression having converging rectilinear portions gradually and progressively flattening the neck portion thereof to bring the sides of said neck portion into substantially one plane.

40. In a machine of the class described, means for moving the sides of a bag neck toward each other comprising a pair of flexible endless opposed traveling members having rectilinear converging portions of comparatively long extent between which said neck moves.

In testimony whereof I affix my signature.

OTELL O. HAMER.